(12) United States Patent
Vairavakkalai

(10) Patent No.: US 8,937,961 B1
(45) Date of Patent: Jan. 20, 2015

(54) MODULAR SOFTWARE ARCHITECTURE FOR A ROUTE SERVER WITHIN AN INTERNET EXCHANGE

(75) Inventor: Kaliraj Vairavakkalai, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 756 days.

(21) Appl. No.: 12/962,268

(22) Filed: Dec. 7, 2010

(51) Int. Cl.
  H04L 12/56 (2006.01)
  G06F 15/173 (2006.01)

(52) U.S. Cl.
  USPC .......................................... 370/401; 709/243

(58) Field of Classification Search
  USPC ............................ 370/254, 389, 401; 709/243
  See application file for complete search history.

(56) References Cited

U.S. PATENT DOCUMENTS

| | | | |
|---|---|---|---|
| 6,463,061 B1 | 10/2002 | Rekhter et al. | |
| 7,080,161 B2 * | 7/2006 | Leddy et al. | 709/250 |
| 7,420,958 B1 | 9/2008 | Marques | |
| 7,590,074 B1 * | 9/2009 | Dondeti et al. | 370/254 |
| 7,848,310 B1 | 12/2010 | Marques | |
| 2004/0034702 A1 * | 2/2004 | He | 709/224 |
| 2004/0223500 A1 | 11/2004 | Sanderson et al. | |
| 2007/0208871 A1 * | 9/2007 | Vasseur et al. | 709/230 |
| 2008/0198858 A1 | 8/2008 | Townsley et al. | |
| 2008/0229095 A1 | 9/2008 | Kalimuthu et al. | |

OTHER PUBLICATIONS

Jasinska et al., "Internet Exchange Route Server," draft-jasinka-ix-bgp-route-server-01, Oct. 26, 2010, 18 pp.
Office Action from U.S. Appl. No. 10/768,492, dated Jun. 27, 2007, 15 pp.
Response to Office Action dated Jun. 27, 2007, from U.S. Appl. No. 10/768,492, filed Sep. 27, 2007, 18 pp.
Office Action from U.S. Appl. No. 10/768,492, dated Dec. 13, 2007, 10 pp.
Response to Office Action dated Dec. 13, 2007, from U.S. Appl. No. 10/768,492, filed Mar. 13, 2008, 18 pp.
Notice of Allowance for U.S. Appl. No. 10/768,492, dated Jun. 17, 2008, 4 pp.
Office Action from U.S. Appl. No. 12/200,603, dated Jan. 4, 2010, 10 pp.
Response to Office Action dated Jan. 4, 2010, from U.S. Appl. No. 12/200,603, filed Apr. 5, 2010, 15 pp.
Notice of Allowance for U.S. Appl. No. 12/200,603, dated Aug. 4, 2010, 7 pp.

\* cited by examiner

*Primary Examiner* — Robert C Scheibel
*Assistant Examiner* — Saba Tsegaye
(74) *Attorney, Agent, or Firm* — Shumaker & Sieffert, P.A.

(57) ABSTRACT

In general, techniques are described that provide a modular software architecture for a route server within an Internet Exchange. The route server comprises an interface and a control unit. The interface receives a route advertisement advertising a route from one of the SP networks and defining attributes for the route. The control unit includes inbound, route and outbound processing modules to process the route advertisement. The inbound processing module updates the route advertisement to add an optional field that stores a copy of the attributes. The route processing module produces an outbound route advertisement that includes attributes of the Internet Exchange and, within the optional field, the original path attributes. The outbound processing module processes the outbound route advertisement to replace the attributes of the Internet Exchange with the original path attributes and outputs the outbound route advertisement to advertise the route to the SP networks.

20 Claims, 6 Drawing Sheets

MODULAR SOFTWARE ARCHITECTURE FOR A ROUTE SERVER WITHIN AN INTERNET EXCHANGE

TECHNICAL FIELD

The invention relates to computer networks and, more particularly, an Internet Exchange point within computer networks.

BACKGROUND

High-speed telecommunications equipment referred to as an Internet Exchange (IX), also referred to as an Internet Exchange Point (IXP), facilitates the direct exchange of Internet traffic between different Internet service providers (ISPs). The Internet Exchange generally operates to allow the member service providers to directly exchange their traffic rather than through one or more third-party networks, thereby reducing latency and bandwidth. The member service providers utilize the Internet Exchange to exchange routing information for their constituent networks to resolve paths to public destinations. Upon receiving this routing information, the member service providers may then resolve this routing information to potentially select one or more routes through a member service provider network advertised through the Internet Exchange. If these Internet Exchange routes are selected, the member service providers may begin routing traffic through the Internet Exchange to the selected routes for delivery to the traffic's intended destination. In this way, the Internet Exchange facilitates the exchange of Internet traffic between different service provider networks.

Internet Exchanges commonly employ a network device referred to as a route server to provide a simplified interconnection between multiple Internet routers of the different member ISPs and thereby enable the exchange of route information between the member service provider networks. Example details of a Border Gateway Protocol (BGP) route server for an Internet Exchange can be found in Jasinska et. al, "Internet Exchange Route Server," published by Internet Engineering Task Force (IETF), Oct. 26, 2010, the entire contents of which are incorporated herein by reference. Typically, route servers for Internet Exchanges are implemented as modified routers, i.e., routers in which stock routing protocols have been programmatically modified to intrusively add special handling functionality for the particular needs of the Internet Exchange. For example, unlike general-purpose core routers, route processing software within a route server process routes and generate route advertisements in a certain manner to allow routing information to be exchanged directly between member service providers as if the service providers were directly connected. In this way, the core route processing software of the route server of the Internet Exchange must operate differently from high-end general purpose routers so as to render its operation as transparent to the member service providers. As such, the Internet Exchange route server becomes unsuitable for use as a general-purpose border router that would normally be used to provide connectivity between different service provider networks. This resulting separation of functionality between route servers and routers makes the software less modular and often leads to difficulties for the manufacturer in maintaining the code base for these two independent product lines.

SUMMARY

In general, the techniques of this disclosure describe a modular software architecture that can be utilized within a general-purpose router so that the router can be deployed as a route server for an Internet Exchange with only minimal modification to its core route-processing software modules. Moreover, the router may be configured to operate as a route server for certain traffic without compromising its ability to function as a general purpose router for other traffic. As a result, the techniques may reduce the need for service providers to separately maintain independent route servers separate from other general-purpose routers within their networks. In addition, the modular architecture and techniques described herein allow a distributed route server to be implemented over a set of interconnected routers with minimal modification to the routers. As such, the techniques may serve as a building block for highly scalable, multi-chassis router server.

The techniques involve the use of a new optional transitive path attribute defined herein. That is, the router server may utilize the new path attribute when advertising routes between member service providers. More specifically, upon receiving a route advertisement from one member service provider, a front-end software component of the route server utilizes the new optional transitive path attribute to store a copy of the original attributes defined in the route advertisement. These original attributes may represent routing information specific to the advertising member, and the optional attribute may therefore store a copy of this routing information. Prior to processing the advertisement with core software routing components of the route server, the front-end software component of the route server may append this additional, optional and transitive attribute to the route advertisement and copy any attributes defined for the routes being advertised into this optional attribute.

The modified route advertisement is then delivered to core route processing modules of the route server, which processes the route advertisement in the same way that a general purpose router would process this router advertisement, including possibly setting new path attributes. That is, the core route processing modules modifies the original attributes to set new path attributes, as is typical, and ignores the new optional transitive path attribute that effectively encapsulates a copy of the original attributes. The cone route processing modules ignore this attribute because it is transitive and, for any transitive path attributes for which the core route processing is not aware, the core route processing module has been programmed to ignore these types of transitive path attributes of which it is not aware. The core processing software modules outputs the processed route advertisement to a back-end software module of the route server. The back-end software component then replaces the modified attributes of the advertisement with the copy of the original attributes stored in the optional transitive field to effectively undo the conventional routing operations performed by the unmodified core route processing modules of the route server. After undoing these modifications to place the route advertisement in a format appropriate for a route server, the back-end software component then outputs the route advertisement with the original attributes to other service provider networks that are members of the Internet Exchange. As such, unlike conventional route servers, the core route processing modules of the route server need not be modified to accommodate particular route server functionality.

In this way, the original attributes of the route advertisement are hidden in an opaque optional field from the core route processing modules of the route server. Thus, these original attributes are in effect internally tunneled within the router server from a thin front-end software component (referred to herein as an inbound processing module) to a thin back-end software component (referred to herein as an outbound processing module). The outbound processing module may then extract the original attributes to undo certain modifications made by the core route processing modules by replacing these modified route attributes with the original route attributes stored as a copy to the optional field. As a result, complex core processing components of a router that implement complex routing algorithms, such as the Border Gateway Protocol (BGP), need not be programmatically modified for deployment within a route server. Consequently, modification to what is usually a highly involved and optimized route processing software need not be made to enable a general router to function as a route server. The manufacturer of the route server may then not need to maintain and troubleshoot two separate code bases for the core route processing software components in order to offer separate product lines for route servers and general purposes, high-end routers.

In one embodiment, a method of exchanging routes between a plurality of service provider networks with a route server of an Internet Exchange comprises receiving a route advertisement advertising a route from one of the plurality of service provider networks with an inbound processing module of a route server, wherein the route advertisement identifies a destination reachable by the route and defines one or more attributes for the route and updating, with the inbound processing module of the route server, the route advertisement to add an optional field that stores a copy of the one or more attributes for the advertised route as original path attributes. The method also comprises processing the updated route advertisement with a route processing module of the route server to update routing information of the route server and produce an outbound route advertisement to advertise the route to one or more of the service provider networks, wherein the outbound route advertisement includes one or more attributes for the Internet Exchange and further includes within the optional field the original path attributes without modification. The method further comprises processing the outbound route advertisement with an output processing module of the route server to replace the attributes of the Internet Exchange with the original path attributes stored within the optional field, and outputting the outbound route advertisement from the route server to advertise the route to one or more of the service provider networks.

In another embodiment, a route server of an Internet Exchange that exchanges routes between a plurality of service provider networks comprises at least one interface that receives a route advertisement advertising a route from one of the plurality of service provider networks, identifying a destination reachable by the route and defining one or more attributes for the route and a control unit that processes the route advertisement. The control unit includes an inbound processing module that updates the route advertisement to add an optional field that stores a copy of the one or more attributes for the advertised routes as original path attributes, a route processing module that updates routing information of the route server and produces an outbound route advertisement to advertise the route to one or more of the service provider networks, wherein the outbound route advertisement includes one or more attributes for the Internet Exchange and further includes within the optional field the original path attributes without modification, and an outbound processing module that processes the outbound route advertisement to replace the attributes of the Internet Exchange with the original path attributes stored within the optional field and outputs the outbound route advertisement to advertise the route to one or more of the service provider networks.

In another embodiment, a network system comprises a plurality of network service providers that each include a provider edge router, and an Internet Exchange that supports advertisement of routes between the plurality of service provider networks, wherein the Internet Exchange includes a route server, and wherein the route server couples to at least one of the provider edge routers of the plurality of service provider networks. The route server includes at least one interface that receives a route advertisement advertising a route from one of the plurality of service provider networks, identifying a destination reachable by the route and defining one or more attributes for the route and a control unit that processes the route advertisement. The control unit includes an inbound processing module that updates the route advertisement to add an optional field that stores a copy of the one or more attributes for the advertised routes as original path attributes, a route processing module that updates routing information of the route server and produces an outbound route advertisement to advertise the route to one or more of the service provider networks, wherein the outbound route advertisement includes one or more attributes for the Internet Exchange and further includes within the optional field the original path attributes without modification, and an outbound processing module that processes the outbound route advertisement to replace the attributes of the Internet Exchange with the original path attributes stored within the optional field and outputs the outbound route advertisement to advertise the route to one or more of the service provider networks.

In another embodiment, a non-transitory computer-readable medium comprises instructions that cause one or more processors of a network device to receiving a route advertisement advertising a route from one of a plurality of service provider networks with an inbound processing module of a route server of an Internet Exchange that exchanges routes between the plurality of service provider networks, wherein the route advertisement identifies a destination reachable by the route and defines one or more attributes for the route, update, with the inbound processing module of the route server, the route advertisement to add an optional field that stores a copy of the one or more attributes for the advertised route as original path attributes, process the updated route advertisement with a route processing module of the route server to update routing information of the route server and produce an outbound route advertisement to advertise the route to one or more of the service provider networks, wherein the outbound route advertisement includes one or more attributes for the Internet Exchange and further includes within the optional field the original path attributes without modification, process the outbound route advertisement with an output processing module of the route server to replace the attributes of the Internet Exchange with the original path attributes stored within the optional field, and output the outbound route advertisement from the route server to advertise the route to one or more of the service provider networks.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
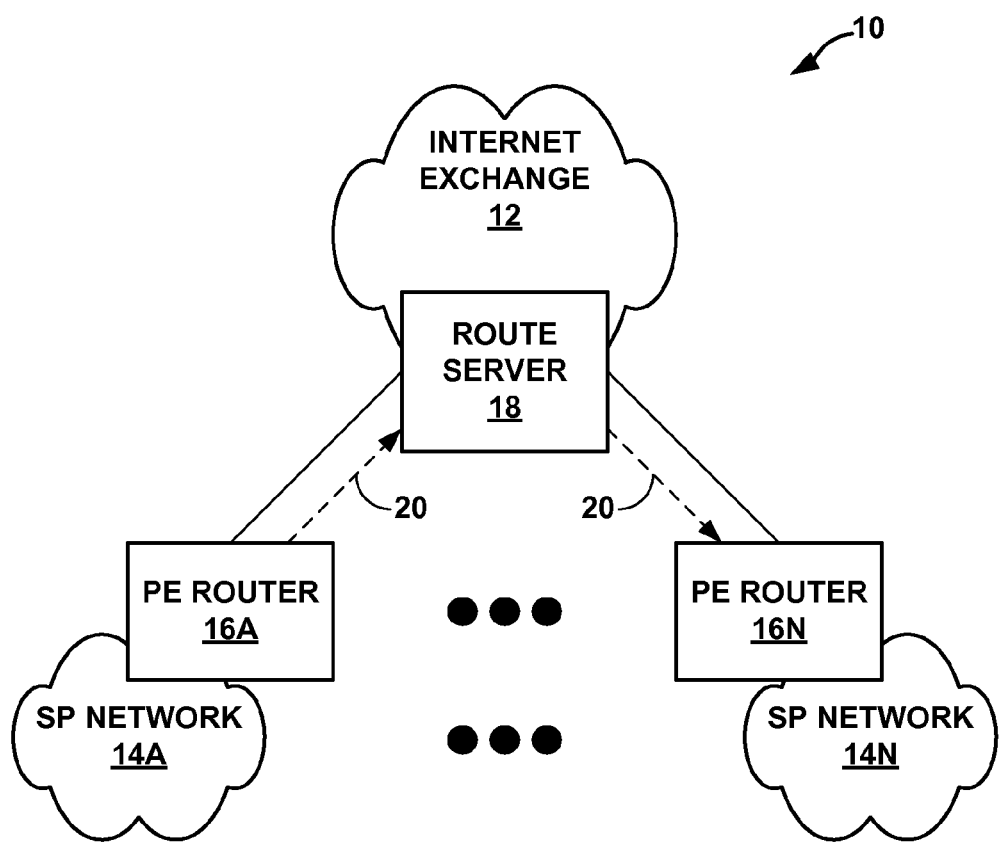
FIG. 1 is a block diagram illustrating an example network system that implements the techniques described in this disclosure.

FIG. 1 is a block diagram illustrating an example network system 10 that implements the techniques described in this disclosure. In the example of FIG. 1, network system 10 includes an Internet Exchange 12 and service provider (SP) networks 14A-14N ("SP networks 14") that are each a member of Internet Exchange 12. Internet Exchange 12 represents a high-speed intermediate computer network that facilitates the exchange of traffic between member SP networks 14 as if the SP networks were directly connected. In other words, Internet Exchange 12 represents the physical infrastructure through which SP networks 14 exchange Internet traffic between each other and operates in a manner that is opaque to the SP networks so that SP network appear to be directly connected from a routing perspective.

Prior to Internet Exchanges, SP networks were required to reach transit agreements with these private third party networks. In these agreements, the third party network charged a fee to carry traffic for a SP network. In some instances, the third party network was an intermediate network located between two SP networks that both served the same geographic location, such as a metropolitan area. If one of the SP networks needed to communicate traffic to the other one of these SP networks, it was common for the third party network to provide the most direct path between these SP networks. If agreement could not be reached with the third party network, the SP network would often select less desirable paths in terms of the number of hops, latency and other network metrics. In some instance, the SP network would route traffic through different continents to reach the other SP network separated by the third party network. Given the inefficiencies present in potentially routing traffic across the world to reach a SP network located on the other side of a metropolitan area, Internet Exchanges were devised to facilitate the exchange of traffic often without cost to the member SP networks.

To exchange traffic between member SP networks 14, Internet Exchange 12 facilitates the exchange of routing information often in the form of route advertisements. The exchange of this routing information is often governed by mutual peering agreements, where a collection of member SP networks 14 agree to operate as a peer networks to each other. Provider Edge (PE) routers 16 of SP networks 14 utilize routing protocols, such as the Border Gateway Protocol (BGP), to exchange route advertisements between the peer networks to advertise available routes. The route advertisements are conveyed in a manner that defines path attributes for the routes as if the peer SP networks 14 are directly connected. In this way, the existence and operation of Internet Exchange 12 must be opaque to PE routers 16 of SP networks 14.

BGP represents a routing or reachability protocol that designates network reachability among autonomous systems (ASes), where an AS refers to a collection of connected Internet Protocol (IP) routing prefixes under the control of one or more network operators that presents a common, clearly defined routing policy to the Internet. Usually, each of SP networks 14 is arranged and maintained such that it presents a common, clearly defined routing policy to the Internet and therefore represents a single AS. BGP advertises routes using a route advertisement formally known as a BGP UPDATE message. This BGP update message includes a number of attributes that are referred to as path attributes in BGP. Example path attributes include an ORIGIN attribute that identifies the so-called BGP speaker that originated the associated routing information specified by the BGP UPDATE message, an AS_PATH attribute that identifies the ASes through which the routing information carried in this UPDATE message has passed, and a NEXT_HOP attribute that defines the IP address of the router that should be used as the next hop to the destinations listed in the UPDATE message. More information regarding BGP in general and specifically, the format of UPDATE messages and the list of path attributes can be found in Request for Comment 4271, entitled "A Border Gateway Protocol 4 (BGP-4)," and dated January 2006, which is herein incorporated by reference as if fully set forth in its entirety.

As noted above, each of SP networks 14 commonly represents a single AS and therefore commonly communicates routing information to Internet Exchange 14 using BGP. SP networks 14 generally include a number of network layer or layer three (L3) devices referred to as routers to facilitate the transfer of data traffic from customer networks (not shown in the example of FIG. 1) to a public network, such as the Internet, where the collection of SP networks 14 may form a portion of the Internet. Reference to layers followed by a number in this disclosure refers to layers of the Open Systems Interconnection (OSI) reference model. As shown in the example of FIG. 1, SP networks 14 each includes a different one of PE routers 16A-16N ("PE routers 16"). PE routers 16 each implement BGP or some other routing or reachability protocol to advertise routing information to Internet Exchange 12.

Internet Exchange 12 includes a route server 18 that represents a network device that interfaces with each of PE routers 16 and facilitates the exchange of these route advertisements between PE routers 16. For example, assuming SP network 14A has a mutual peering agreement with SP network 14N, PE router 16A generates and transmits a route advertisement 20 in accordance with BGP to route server 18. Route server 18 processes this route advertisement 20 in accordance with the assumed mutual peering agreement between SP network 14A and SP network 14N and forwards route advertisement 20 to PE router 16N. PE router 16N may then process this route advertisement 20 and update its database of routing information (which is referred to as a routing information base ("RIB") in the context of BGP). PE router 16N then resolves the routing information in the RIB to select a path to each network destination known to PE router 16N via it RIB. This path selection process is often involved and requires significant amounts of processing to arrive at the selected paths to each destination. From these selected paths, PE router 16N derives a so-called "next hop" that identifies, in this context, the interface of PE router 16N from which traffic to each destination is to be sent. This next hop information is referred to as forwarding information and PE router 16N loads this forwarding information into a forwarding information base (FIB) for use in routing traffic.

Upon receiving traffic destined to SP network 14A, PE router 16N performs a lookup in its FIB to select the interface connecting PE router 16N to route server 18 and forwards the traffic via the selected interface to route server 18. Route server 18 then forwards this traffic to PE router 16A, which proceeds to forward the traffic from PE router 16N to its intended destination within SP network 14A. In this way, Internet Exchange 12 facilitates the exchange of routing information and traffic between SP networks 14.

In some instances, route server 18 represents a L3 network device, such as a router, that has been modified to provide Internet Exchange functionality. As described herein, route server 18 utilizes a modular software architecture in which core route processing components (e.g., routing protocols such as BGP) are layered between a thin front-end software component (referred to as an inbound processing module) and a thin back-end software component (referred to as an outbound processing module). The inbound processing module prepares a BGP or other routing protocol route advertisement for processing by the route processing components. The inbound processing module may implement the first phase of the BGP UPDATE message handling procedure defined in section 9.1.1 of the above incorporated RFC 4271. The route processing module performs, in the case of BGP, the second route selection phase of the BGP UPDATE message handling procedure defined in section 9.1.2 of the above incorporate RFC 4271. The outbound processing module may implement the third route dissemination phase of the BGP UPDATE message handling procedure defined in section 9.1.3 of the above incorporate RFC 4271. The core route processing component is usually more complex than the inbound message processing and the outbound route dissemination and includes performing the routing algorithms for route selection by analyzing the entire RIB and selecting routes to all of the network destinations.

Commonly, the core route processing components operate in a route server than a general-purpose, high-end router, as most of the differences in handling route advertisements by routers and route servers involve differences in performing route selection. For example, the route processing module of a router updates the AS_PATH attribute of a BGP UPDATE message to append its AS number to the list of one or more AS numbers defined by this AS_PATH attribute. A route server however need not add is AS number to the AS_PATH attribute as it provides a direct exchange and does not itself participate in BGP. Consequently, core route processing software of a general router is normally programmatically modified so that it does not, for example, alter the AS_PATH attribute and thereby may provide Internet Exchange functionality and act as a route server. The modification of the route processing module, which again is normally the most involved and critical module in terms of processing routing information, generally results in a division of either hardware or software. When implemented in software, such modification splits the code base into two different branches, i.e., one branch for routers and another branch for route servers. This split in either hardware or software results in less modular hardware or software, which in turn presents a number of difficulties, especially in terms of maintenance.

In contrast, in the modular software architecture of route server 18 only the front-end software component and the back-end software component are programmatically different from a general purpose, high-end router. That is, the core route processing modules are unmodified and, therefore, can be similar to those utilized by other routers. The techniques make use of a form of attribute tunneling to tunnel the original path attributes from the inbound processing module of route server 18 to the outbound processing module of route server 18 through the core route processing module. In this way, the route processing module is able to perform conventional route processing as would be performed by a general router or any other network device that processes routing information outside of the context of Internet Exchanges. As one example, this route processing module of route server 18 may appends a local AS number of Internet Exchange 12 to the AS_PATH attribute of route advertisement 20 as any other intermediate AS. The outbound processing module of route server 18, however, replaces this modified AS_PATH attribute and any other attributes of the outbound advertisement with the tunneled attributes after the route processing module has finished processing the route advertisement. Thus, the route processing module of route server 18 need not utilize software that is programmatically different from other routers. IN this way, the techniques avoid the split of core route processing software into a code base that is dedicated to Internet Exchanges and another code base that is used for general routing contexts. The additional functionality of the thin inbound outbound processing modules can be enabled or disabled depending on whether the router is being deployed as a standard router or a route server. Moreover, the functionality may be enabled on a per-interface level, thereby allowing the route server 18 to operate as a route server when forwarding traffic between member SP networks 14 and as a general router when forwarding other network traffic.

To perform this tunneling, inbound processing module receives an inbound route advertisement 20 advertising a route from one of a plurality of service provider networks 14. As noted above, this inbound route advertisement 20 defines one or more attributes for the advertised route. The inbound processing module updates the route advertisement to add an optional field that stores a copy of the one or more attributes for the advertised routes. This optional field may comprise a new BGP path-attribute referred to as a "Route-Server Attribute" (which may be abbreviated as "RS-ATTR"). The inbound processing module copies all of the attributes specified in inbound route advertisement 20 to the RS-ATTR. The inbound processing module then forwards this updated route advertisement 20 to the route processing module. Using this optional field, which in the context of BGP may be referred to as the new BGP RS-ATTR, the inbound processing module may tunnel the original path or route attributes through the route processing module by leveraging the optional nature of this new field. That is, BGP and most other routing protocols specify that for optional path or route attributes, the route processing module or any other module that processes these unknown optional path attributes are not to modify these attributes when they are unknown and to treat the optional path attributes as opaque values.

As a result of this way of processing unknown optional path attributes, such as the new BGP RS-ATTR, the route processing module processes route advertisement 20, modifying the one or more attributes for the advertised route without modifying the copy of the one or more attributes stored to the optional BGP RS-ATTR. The route processing module then outputs the processed route advertisement as outbound route advertisement 20B that includes the modified one or more attributes and the optional field that stores the unmodified copy of the one or more attributes. The outbound route processing module, in this single route server instance, receives this processed route advertisement and replaces the modified one or more attributes with the copy of the original one or more attributes. In this sense, the optional BGP RS-ATTR transparently carries or otherwise tunnels the original path attributes through the route processing module from the inbound processing module to the outbound processing module.

In this way, the original attributes of route advertisement 20 are hidden in an opaque optional field from the core route processing module of the route server such that these original attributes are in effect tunneled from the inbound processing module to the outbound processing module. The outbound processing module may then undo any modifications that the unmodified route processing module makes to the original attributes by replacing these modified route attributes with the original route attributes stored as a copy to the optional field. Consequently, modification to what is usually a highly involved and optimized or core route processing module need not be made to enable a general router to function as a route server. When implemented in software, the designers of software for the route server may then not need to maintain and troubleshoot two separate route processing modules for the separate route servers and routers. In this sense, the route processing software may be maintained more generally for both the route server and the router.

The outbound route processing module removes the optional BGP RS-ATTR and forwards this reconstructed route advertisement as outbound route advertisement 20B to one or more other ones of SP networks 14 to advertise routes between SP networks 14. In some instances, outbound route processing module stores data defining one or more policies. Outbound route processing module applies these policies in this instance to determine which of SP networks 14 should receive this route advertisement 20B. Usually, these policies are configured by an administrator or other network operator of Internet Exchange 12 in accordance with particular rules or policies specified by the various service providers that own and operate SP networks 14. These policies and other aspects of the techniques described in this disclosure are described in more detail with respect to the following FIG. 2.

While described above with respect to a single route server instance, route server 18 may represent a logical route server 18 comprised of two or more physical routers that implement the techniques described in this disclosure. That is, two or more routers may implement the techniques described herein and coordinate their operations such that these two or more routers logically reveal themselves to SP networks 14 as a single router server 18. In these instances, the two or more routers may reside within a chassis having a backplane that interconnects the two or more routers to one another. A first one of the routers may include the inbound processing module while a different or second one of the routers may include the outbound processing module. In this sense, a single router server 18 comprised of two or more physical routers may implement the techniques described in this disclosure to provide route server functionality.

Figure 2:
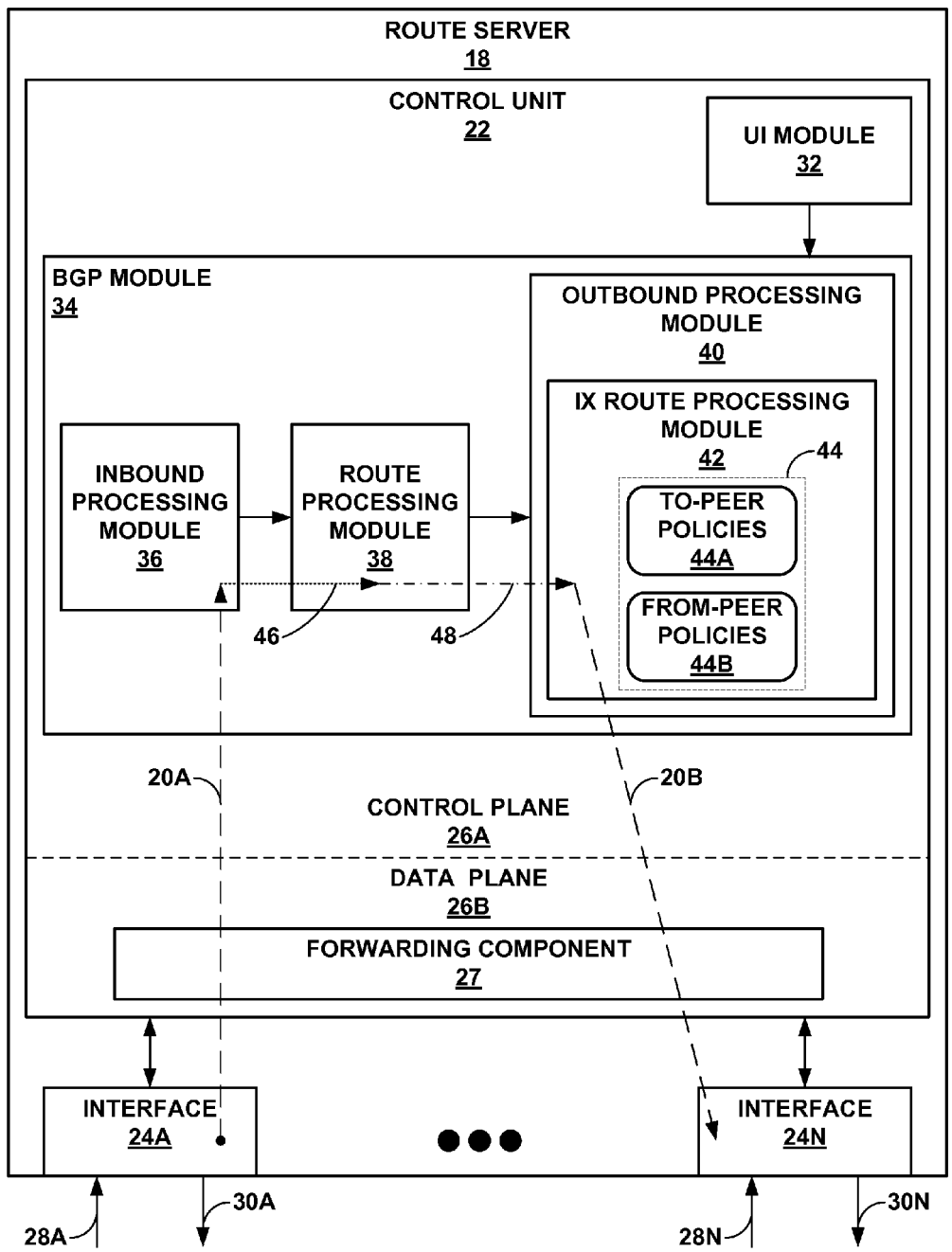
FIG. 2 is a block diagram illustrating the route server of FIG. 1 in more detail.

FIG. 2 is a block diagram illustrating an example embodiment of route server 18 of FIG. 1 in more detail. In the example of FIG. 2, route server 18 includes a control unit 22 and interfaces 24A-24N ("interfaces 24"). Control unit 22 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 22 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 can be logically divided into separate planes referred to as a "control plane" and a "data plane," which are shown in the example of FIG. 2 as control plane 26A and data plane 26B. Control plane 26A provides the routing or control functionality of route server 18. In this respect, control plane 26A may represent hardware or a combination of hardware and software of control unit 22 that implements routing protocols, such as BGP, by which routing information may be determined. The routing information may include information defining a topology of a service provider network. Control plane 26A generally resolves the topology defined by the routing information to select or determine one or more routes through the service provider network. Control plane 26A, again in the context of a standard router, then updates data plane 26B with these routes, where data plane 26B maintains these routes as forwarding information. Data plane 26B may each represent hardware or a combination of hardware and software of control unit 30 that forwards network traffic in accordance with the forwarding information. Data plane 26B includes a forwarding component 27 that performs the forwarding of data in accordance with the forwarding information. The techniques described in this disclosure are generally implemented in the control planes of control unit 30 considering that the techniques involve routing protocols, such as BGP.

Interfaces 24 represent interfaces that receive and send packet flows or network traffic via inbound network links 28A-28N ("inbound network links 28") and outbound network links 30A-30N ("outbound network links 30"), respectively. Route server 18 typically includes a chassis (not shown in the example of FIG. 2) having a number of slots for receiving a set of cards, including interface cards that provide interfaces 24. Each card may be inserted into a corresponding slot of a chassis for communicably coupling the card to control unit 22 via a bus, backplane, or other electrical communication mechanism. The interface cards are typically coupled to network links 28, 30 via a number of interface ports (not shown), and forward and receive packets and control information from control unit 22 via respective paths (which, for ease of illustration purposes, are not explicitly denoted in FIG. 2).

In this example, control unit 22 provides an operating environment for a number of different software modules 32-42 that may be executed by one or more processors. User interface (UI) module 32 ("UI module 32") represents a module that provides a user interface by which an administrator or other network operator of route server 18 may interface to interact with control plane 26A of control unit 22. UI module 32 may provide a graphical user interface (GUI), a command line interface (CLI) or any other user interface by which configuration and other information may be entered to configure control plane 26A, and through control plane 26A, data plane 26B.

BGP module 34 represents a set of software modules that implement the BGP routing protocol. As shown, BGP module 34 is arranged as a modular software architecture in which core route processing module 38 are layered between a front-end software component (inbound processing module 36) and a back-end software component (outbound processing module 40). Inbound processing module 36, as described above, prepares a BGP route advertisement for processing by route processing module 38. Inbound processing module 36 may implement the first phase of the BGP UPDATE message handling procedure defined in section 9.1.1 of the above incorporated RFC 4271. Route processing module 38 may represent a module that performs the second route selection phase of the BGP UPDATE message handling procedure defined in section 9.1.2 of the above incorporate RFC 4271. Outbound processing module 40 may implement the third route dissemination phase of the BGP UPDATE message handling procedure defined in section 9.1.3 of the above incorporate RFC 4271. As noted above, the route processing performed by route processing module 38 is usually more complex than the inbound message processing and the outbound route dissemination. For example, route processing module 38 may utilize complex algorithms and data structures to maintain a large routing information base and perform route selection to program data plane 26 with specific forwarding information.

Outbound processing module 40 includes an Internet Exchange (IX) route processing module 42 ("IX route processing module 42"). This IX route processing module 42 may perform some aspects of route processing module 38 only in the context of an Internet Exchange rather than in the context of standard networks. IX route processing module 42 may understand and operate on the BGP path attributes stored to the optional field, i.e., the new BGP RS-ATTR in this example, rather than operate on routes themselves. IX route processing module 42 stores data defining to-peer policies 44A and from-peer policies 44B. To-peer policies 44A define rules for forwarding route advertisements based on which of the SP networks 14 the route advertisement is to be forwarded. From-peer policies 44B define rules for forwarding a route advertisement based on which of SP networks 14 sent the route advertisement.

While shown as separate policies 44A, 44B ("policies 44"), these policies 44 may be defined in a manner so that one qualifies another. That is, to-peer policies 44A may be applied first based on the destination address to which the route advertisement is to be forwarded to retrieve a list of destination addresses to which this route advertisement should be forwarded. Next, from-peer policies 44B may be applied based on the source address from which the route advertisement was sent to further refine the list of destination addresses to which this route advertisement should be forwarded. In this sense, policies 44 may collectively represent a per to-peer per from-peer policies database, where the to-peer is the primary key and the from-peer is the secondary key. Thus, while described as being separate policies 44 in this disclosure, policies 44 may represent hierarchical policies that are applied on after another to further determine to which peers this route advertisement is to be forwarded.

In accordance with the techniques described in this disclosure, an administrator or other network operator interfaces with control plane 26A via a user interface presented by UI module 32 so as to configure BGP module 34 to act as a route server rather than an ordinary or standard router. In other words, the administrator may configure BGP module 34 such that inbound processing module 36 tunnels the original path attributes specified in a route advertisement through route processing module 38 using an optional RS-ATTR. In addition, the administrator may define or otherwise specify to-peer policies 44A and from-peer policies 44B within IX route processing module 42. Once configured, interface 24A may receive route advertisement 20 via inbound network link 28A from PE router 16A shown in the example of FIG. 1. Interface 24A forwards this route advertisement to forwarding component 27 within data plane 26B. Forwarding component 27 recognizes this route advertisement as a control plane message and forwards this route advertisement to control plane 26A, which directs route advertisement 20 to BGP module 34.

Inbound processing module 36 of BGP module 34 receives inbound route advertisement 20 and updates route advertisement 20 to add a new BGP path attribute, RS-ATTR, to route advertisement 20, generating an updated route advertisement 46. In some instances, inbound processing module 36 may include one or more inbound policies (not shown in FIG. 2), which inbound processing module 36 applies to inbound route advertisement 20. Inbound processing module 36 applies these inbound policies to determine whether or not to add the new BGP path attribute to route advertisement 20. In this respect, the inbound policies identify route advertisement that require Internet Exchange handling rather than typical route handling. In this sense, the one or more routers forming route server 18 may both process route advertisements in the normal routing context and, in addition, process route advertisements in the Internet Exchange context. In some instances, the one or more routers forming route server 18 may process some route advertisements using the core route processing modules while also processing other route advertisement using the techniques described in this disclosure to tunnel the attributes through the core route processing modules.

Assuming that application of these inbound policies indicates that inbound processing module 36 is to generate updated route advertisement 46, inbound processing module 36 then copies the original path attributes specified by route advertisement 20 to define one or more routes through SP network 14A to the optional RS-ATTR. Inbound processing module 36 outputs updated route advertisement 46 to route processing module 38, which proceeds to perform route processing in accordance with BGP as if route processing module 38 were operating in a standard routing context. As a result, route processing module 38 changes, updates and generally modifies any number of the original path attributes specified by route advertisement 20 to define one or more routes through SP network 14A. Route processing module 38, in other words, has not been modified to perform route processing in the context of Internet Exchange 12 and outputs updated route advertisement 46 as a processed route advertisement 48. Route processing module 38, however, does not update, change or otherwise modify the copy of the original path attributes stored to RS-ATTR by virtue of BGP's treatment of unknown path attributes. That is, unknown path attributes are ignored in BGP but maintained through route processing module 38. Considering that route processing module 38 has not been modified to accommodate or otherwise know of this new BGP attribute, RS-ATTR, route processing module 38 ignores this RS-ATTR and forwards processed route attribute 48 to outbound processing module 40 with the RS-ATTR intact.

Outbound processing module 40 and, more specifically, IX route processing module 42 receives this processed route advertisement 48 with the RS-ATTR intact and unmodified. IX route processing module 42 then applies policies 44 to the RS-ATTR optional BGP path attribute to select to-peers to which this route advertisement 48 should be forwarded. That is, these to-peer policies 44A and from-peer policies 44B are applied to the optional BGP path attribute rather than to the route specified by route advertisement 48. The original path attributes stored to RS-ATTR also specifies a to-peer address to which these path attributes that define the route are to be sent and to-peer policies 44A are applied to this to-peer address. The optional BGP path attribute RS-ATTR may store a from-peer address to which the from-peer policies 44B are applied. These policies 44A, 44B ("policies 44") define the rules, as one example, as a table or other data structure capable of associating a to-peer address in the case of to-peer policies 44A and a from-peer address in the case of from-peer policies 44B with a one or more peers, i.e., PE routers 16 in this example. The one or more peers may be identified by the IP address associated with each of their respective PE devices 16. Using the to-peer and from-peer addresses extracted from the RS-ATTR, IX route processing module 42 may perform a lookup in this table to identify the one or more peers associated with the extracted to-peer and from-peer addresses to which route advertisement 20 is to be forwarded.

After applying policies 44 to identify the set of peers to which route advertisement 48 is to be forwarded, IX route processing module 42 replaces the modified one or more original path attributes with the copy of the original path attributes stored to the BGP RS-ATTR, effectively removing any modifications previously performed during route processing by route processing module 38 to generate outbound route advertisement 20B. IX route processing module 42 then outputs a copy of outbound route advertisement 20B to each of the identified peers, i.e., one or more of PE routers 16 in this example. Forwarding component 27 receives these route advertisements 20B and forwards these via the appropriate one of interfaces 24 such that these route advertisements 20B are directed to the identified peers.

Moreover, in some instances, although not shown in the example of FIG. 2, BGP module 34 may apply standard BGP route-policies for the from-peer in the inbound direction and the to-peer in the outbound direction. That is, inbound processing module 36 may apply from-peer standard BGP route-policies in the inbound direction and outbound processing module 40 may apply to-peer standard BGP route-policies in the outbound direction. The techniques described in this disclosure are flexible with respect to policies as these policies can be applied at two levels, i.e., the regular BGP route policy level are applied in the context of ordinary route processing and IX policies 44 are applied in the context of IXes. In this way, both regular BGP processing may proceed when the underlying router operates on those route advertisements from non-member SP networks and Internet Exchange-specific BGP processing may proceed when the underlying router operates on those route advertisements from member SP networks.

In this respect again, the techniques are flexibly in that the router may operate concurrently as both a router and a route server in the context of an Internet Exchange. As described above, the determination of whether to operate on route advertisements as a router or a route server is controlled by inbound policies which identify route advertisements as coming from Internet Exchange member SP networks or non-Internet Exchange member SP networks depending on which interface received the route advertisement. It is assumed in this disclosure for ease of illustration purposes that all route advertisements are from member SP networks and therefore require application of the techniques described herein. The techniques should not be limited to the examples set forth in this disclosure and may be applied selectively so as to permit the underlying router to function both as a router and as a route server depending on which interface the route advertisement is received.

Figure 3:
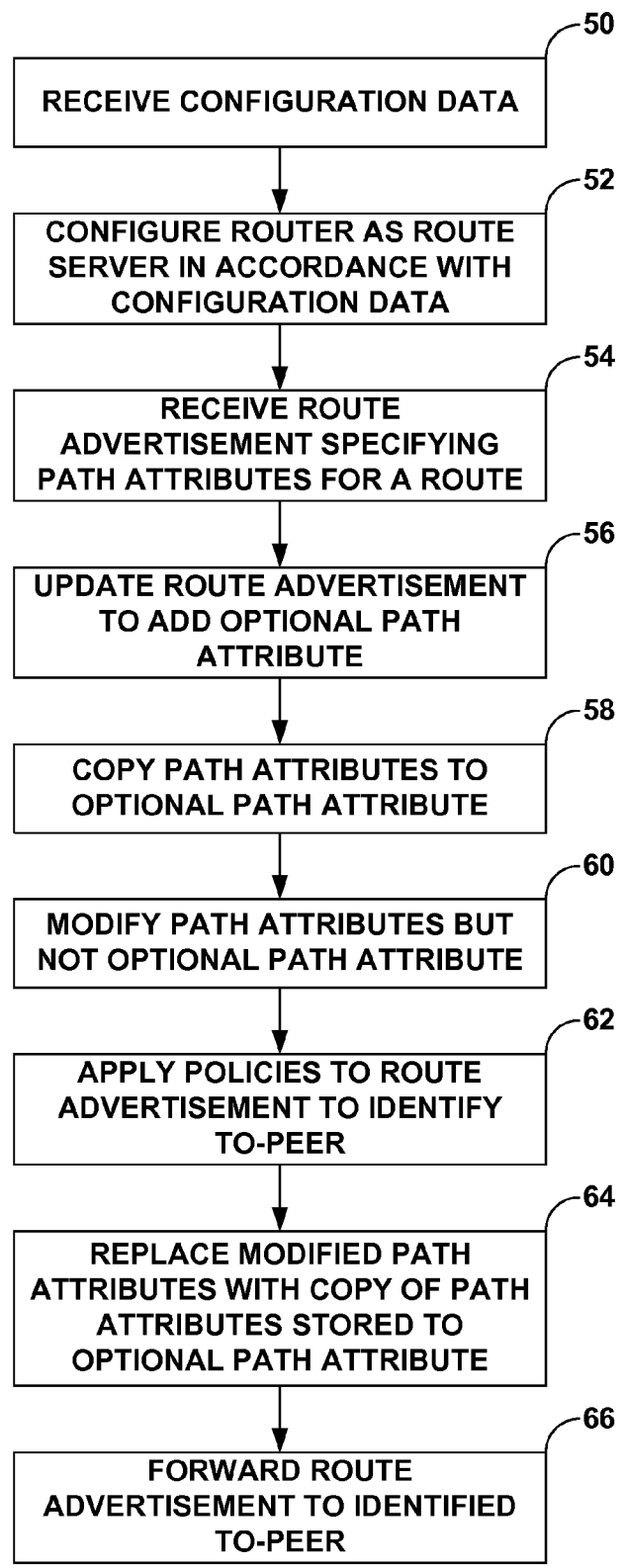
FIG. 3 is a flowchart illustrating exemplary operation of a network device in implementing aspects of the techniques described in this disclosure.

FIG. 3 is a flowchart illustrating exemplary operation of a network device, such as route server 18 shown in the example of FIGS. 1 and 2, in implementing the techniques described in this disclosure. While described with respect to route server 18, the techniques may generally be implemented by any network device capable of facilitating the exchange of routing information between two or more service provider networks.

Initially, an administrator or other network operator interfaces with a user interface presented by UI module 32 to enter configuration data that configures a router to act as a route server. In other words, a router that implements the techniques described in this disclosure may be able to act as a standard router or a route server. The administrator interfaces with the user interface presented by UI module 32 to enter configuration data that either configures this router to act as a standard router or a route server. The administrator, in this example, inputs configuration data that configures the router to acts as a route server. UI module 32, therefore, receives this configuration data and configures the router as route server 18 in accordance with the configuration data (50, 52).

As noted above, configuration of route server 18 in accordance with the configuration data may include configuring route server 18 to act as a route server with respect to a first set of one or more of interfaces 24 while concurrently configuring route server 18 to act as a router with respect to a second different set of one or more of interfaces 24. In this respect, the configuration data may identify the first set of one or more of interfaces 24 and specify that the underlying router is to act as a route server peer with respect to this first set of interfaces 24. This or other configuration data may then identify the second set of interfaces 24 and specify that the underlying router is to act as an Internet-peer with respect to this second set of interfaces 24. In this respect, the techniques may enable a router to both act, often concurrently, as a route server with respect to some peers and an Internet peer with respect to other peers.

Once configured, one of interfaces 24, i.e., interface 24A in this example, receives a route advertisement 20, as described above (54). Interface 24A forwards this route advertisement 20 to forwarding component 27, which in turn forwards route advertisement 20 to inbound processing module 36 of BGP module 34. As described above, inbound processing module 36 updates route advertisement 20 to add an optional path attribute referred to in this disclosure as RS-ATTR (56). Inbound processing module 36 then copies the original path attributes specified by route advertisement 20 to define one or more routes through SP network 14A to the optional path attribute (58). Inbound processing module 36 outputs this updated route advertisement 46 to route processing module 38, which proceeds to process updated route advertisement 46. In processing updated route advertisement 46, route processing module 46, which has not been modified to act appropriately within the context of an Internet Exchange, modifies one or more of the path attributes, but not the optional path attributes for reasons disclosed above (60). Route processing module 38 then outputs processed route advertisement 48 to outbound processing module 40.

IX route processing module 42 of outbound processing module 40 receives processed route advertisement 48 and applies policies 44 to processed route advertisement 48 to identify those peers, i.e., those of PE routers 16, to which to forward route advertisement 20B in the manner described above (62). IX route processing module 42 then replaces the modified one or more path attributes with the copy of the path attributes stored to the optional path attribute RS-ATTR and removes the RS-ATTR (64). In this way, IX route processing module 42 effectively undoes any of the standard context route processing performed by route processing module 38 to reconstruct originally received route advertisement 20. IX route processing module 42 then forwards route advertisement 20B to the identified peers (66).

Figure 4:
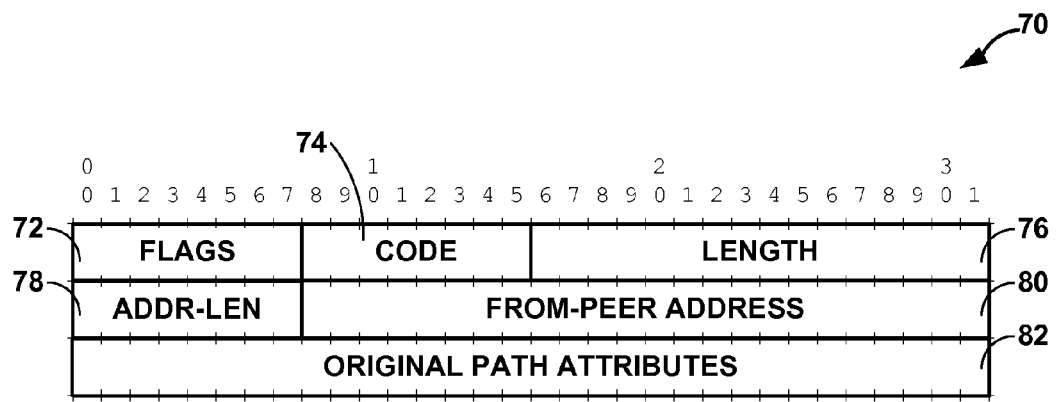
FIG. 4 is a block diagram illustrating an example optional path attribute for use in tunneling path attributes through a route processing module in accordance with the techniques described in this disclosure.

FIG. 4 is a block diagram illustrating an example format for an optional path attribute 70 for use in tunneling path attributes through a route processing module in accordance with the techniques described in this disclosure. In the example of FIG. 4, route advertisement 70 is shown as a number of 32-bit wide words. The first word or row of optional path attribute 70 includes a flags field 72, a code field 74 and a length field 76. Flags field 72 represents a field used to flag or signal the content or other aspects of optional path attribute 70. Code field 74 represents a field that specifies a code associated with optional path attribute 70. The code stored to code field 74 is used to identify this optional path attribute 70. Route processing modules that do not recognize the code stored to code field 74 overlook this optional path attribute 70, leaving it intact or unmodified. Length field 76 specifies a length of optional path attribute 70 as a constant one byte (the size of an address length (ADDR-LEN) field 78) plus the size of a from-peer address field 80 in bytes plus the size of original path attributes field 82 in bytes.

The second 32-bit word or row of optional path attribute 70 includes ADDR-LEN field 78 and from-peer address field 80. ADDR-LEN field 78 represents a field to specify the length of from-peer address field 80. From-peer address field 80 represents a field to specify an address associated with the one of PE routers 16 from which the route advertisement to which this optional path attribute 70 is added. Typically, this address is specified as an IP address. With the ongoing switch from IP version 4 (IPv4) to IP version 6 (IPv6), ADDR-LEN field 78 is necessary considering that IPv4 addresses are a different length than IPv6 addresses. Consequently, ADDR-LEN field 78 is required so as to properly parse the address stored to from-peer address field 80.

The from-peer address is specified in this optional path attribute 70 to provide additional information to IX route processing module of an outbound processing module, such as IX route processing module 42 of outbound processing module 40, for use in application of policies, such as policies 44, and particularly from-peer policies 44B. Normal route processing as performed by route processing module 38 may destroy or otherwise alter the original from-peer address specified in the route advertisement. To preserve this information, inbound processing module 36 specifies the from-peer IP address in from-peer address field 80. IX route processing module 42 then uses this from-peer address when evaluating the application of policies 44B to identify one or more of SP networks 14 to which the attached routing advertisement should be forwarded.

The third 32-bit word or row of optional path attribute 70 includes an original path attributes field 82 that represents a field that may span multiple 32-bit words or rows (although not shown in the example of FIG. 4 for ease of illustration purposes) so as to store all of the path attributes originally specified in the route advertisement to which this optional path attribute 70 is added or appended. An inbound processing module, such as inbound processing module 36 shown in the example of FIG. 2, copies the original path attributes to this field 80, effectively tunneling these original path attributes through route processing module 38, to outbound processing module 40, leveraging the aspect of BGP that requires route processing module 38 not modify this path attribute 70 when route processing module 38 not recognize the code stored to code field 74. Considering that route processing module 38 has not been modified and this RS-ATTR is a new attribute, route processing module 38 or any other standard BGP module does not recognize this code and therefore skips this attribute 70 in accordance with BGP.

Figure 5:
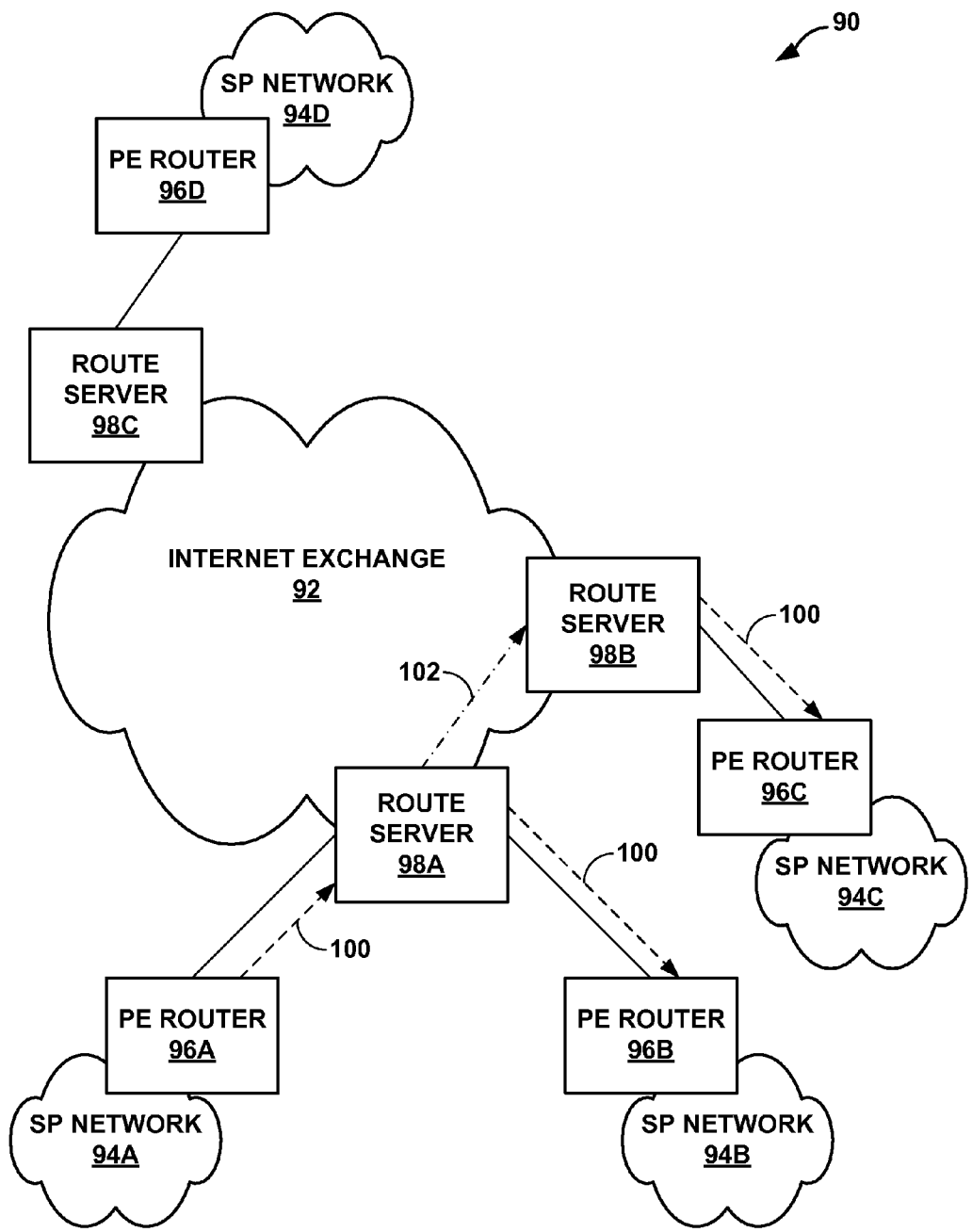
FIG. 5 is a block diagram illustrating another network system that implements the techniques described in this disclosure.

FIG. 5 is a block diagram illustrating another network system 90 that implements the techniques described in this disclosure. As shown in the example of FIG. 5, network system 90 includes an Internet Exchange 92 and member SP networks 94A-94D ("SP networks 94"). Each of SP networks 94 include a respective PE router 96A-96D ("PE routers 96"). Internet Exchange is substantially similar to Internet Exchange 12 in terms of functionality, however Internet Exchange 92 includes a cluster of route servers 98A-98C ("route servers 98") that facilitate the exchange of routing information between SP networks 94 rather than a single route server 18. SP networks 94 and PE routers 96 are substantially similar to SP networks 14 and PE routers 16 in terms of functionality. In the example of FIG. 5, PE routers 96A and 96B couple to route server 98A, PE router 96C couples to route server 96B and PE router 96D couples to route server 98C. Although not shown in the example of FIG. 5, each of route servers 98 may couple to one another via one or more links and/or intervening devices, such as routers, hubs, switches and the like.

Each of route servers 98 generally function similar to and include similar components or modules similar to that of route server 18, as shown in the example of FIG. 2, except that outbound routing module 40 and, more specifically, IX routing processing module 42, does not always automatically replace the modified one or more path attributes with the copy of the original path attributes stored to the new optional BGP RS-ATTR. Instead, IX route processing module 42 applies one or more of policies 44 to identify to which of SP networks 94 to forward a given route advertisement and then resolves whether the identified SP networks 94 are local or remote to the one of route servers 98 currently processing the route advertisement.

For example, assuming route server 98A receives a route advertisement 100, inbound route processing module 36 of route server 98A updates route advertisement 100 to add the optional BGP-ATTR and copies the original path attributes originally specified in received route advertisement 100 to the optional RS-ATTR in the manner described above. Route processing module 38 of this same route server 98A then processes this updated route advertisement to generate a processed route advertisement 102 in which the original path attributes are modified but the copy of the original path attributes stored to the RS-ATTR are not modified. IX route processing module 42 of route server 98A receives this process route advertisement 102 and applies policies 44 in the manner described above to identify one or more of its to-peers to which route advertisement 100 should be forwarded, where the to-peers refer to PE routers 96A, 96B and route servers 98B, 98C in this example. However, rather than immediately copy the original path attributes stored to the RS-ATTR back into their respective proper path attributes, overwriting any path attributes previously modified by route processing module 38 to reconstruct route advertisement 100, IX route processing module 42 resolves whether the identified peers are local or remote to route server 98A.

Local peers to a particular route server refers to those peers that gain access to Internet Exchange 92 via that particular route server, while remote peers refer to peers that that access Internet Exchange 92 through another route server different from the particular route server. In the example of FIG. 5, PE routers 96A and 96B are local to route server 98A while PE routers 96C, 96D are remote to route server 98A. With respect to route server 98B, PE router 96A, 96B and 96D are remote, while PE router 96C is local to route server 98B. With respect to route server 98C, PE routers 96A, 96B and 96C are remote, while PE router 96D is local to route server 98C. For those of the identified PE routers 96 determined to be remote, route server 98A forwards processed route advertisement 102. For those of the identified PE routers 96 determine to be local, route server 98A forwards a reconstructed route advertisement 100 in a manner substantially similar to that described above with respect to single route server 18, as described above with respect to FIGS. 1-3.

In the example of FIG. 5, it is assumed that IX route processing module 42 identifies PE router 96C as one of PE router 96 to which route advertisement 100 should be forwarded along with PE router 96B. IX route processing module 42 then forwards processed route advertisement 102 to route server 98B, whereupon route server 98B recognizes this as a control message and forwards processed route advertisement 102 to BGP module 34 of route server 98B. Inbound processing module 36 of BGP module 34 determines that this processed route advertisement 102 already has an RS-ATTR and, in response to this determination, outputs this processed route advertisement 102 to route processing module 38 of route server 98B. This route processing module 38 further modifies the already modified path attributes, outputting the processed route advertisement to IX route processing module 42 of route server 98B. IX route processing module 42 applies policies 44 and determines that this processed route advertisement 102 should be forwarded to local PE router 96C. In response to this determination, IX route processing module 42 of route server 98B reconstructs route advertisement 100 by replacing the original path attributes stored to the optional BGP RS-ATTR back in their originally specified path attributes, overwriting any modification performed by intervening route processing modules 38 of both route server 98A and route server 98B. This IX route processing module 42 of route server 98B then outputs reconstructed route advertisement 100 to PE router 96C, which proceeds to forward the route advertisement to SP network 94C after updating its own routing information.

This route server cluster shown in the example of FIG. 5 may be referred to as a distributed route server considering that the inbound and outbound route processing modules may exist in different so-called BGP speakers, which in the example above are route servers 98A and 98B. Generally, router servers 98 are configured in an internal BGP (IBGP) peering mesh within the Internet Exchange domain, where each of route servers 98 are typically configured to communicate with every other one of route servers 98 in what is referred to as a full-mesh configuration. The RS-ATTR is transported from route server 98A to route server 98B over IBGP transparently because it is set as an Optional-Transitive attribute. To be able to transport routes for the same prefix from multiple client routers, such as when two or more PE routers reside in the same SP network and both connect to the same one of route servers 98, the IBGP peering mesh between the route servers can have "add path" enabled so that the one of route servers that connects to both of the PE routers in the same SP network is able to advertise to other route servers in the IBGP peering mesh routes received from both of the PE routers and be able to distinguish between the route advertisements from these different routers. Moreover, enabling "add path" provides all of the route server members with full visibility of the customer routers. In other words, enabling "add path" configures router servers 98 such that one of route servers 98's best-path-selection-process does not hide the non-best routes (as determined by this one of route servers 98) from the other ones of route servers 98 when advertising routes among route servers 98. More information regarding "add path" or "add-path" can be found in a Internet Draft of the Internet Engineering Task Force (IETF), entitled "Advertisement of Multiple Paths in BGP," the entire contents of which are incorporated herein by reference as if set forth in its entirety. These techniques enable an Internet Exchange operator to incrementally add route servers to the Internet Exchange route server cluster to serve a large number of SP networks, resulting in what may be referred to as a route server cloud.

In this example system, each of route servers 98 may represent a different underlying router that collectively operate as a single distributed route server in certain instances. In other words, the example of FIG. 5 shows a number of different route servers that each represent routers adapted to perform the techniques described in this disclosure such that these routers may interact with one another to logically form a single route server. The techniques should therefore not be limited to a single physical device, i.e., router in this example, but may be implemented with respect to any number of devices to form a distributed router server.

Figure 6:
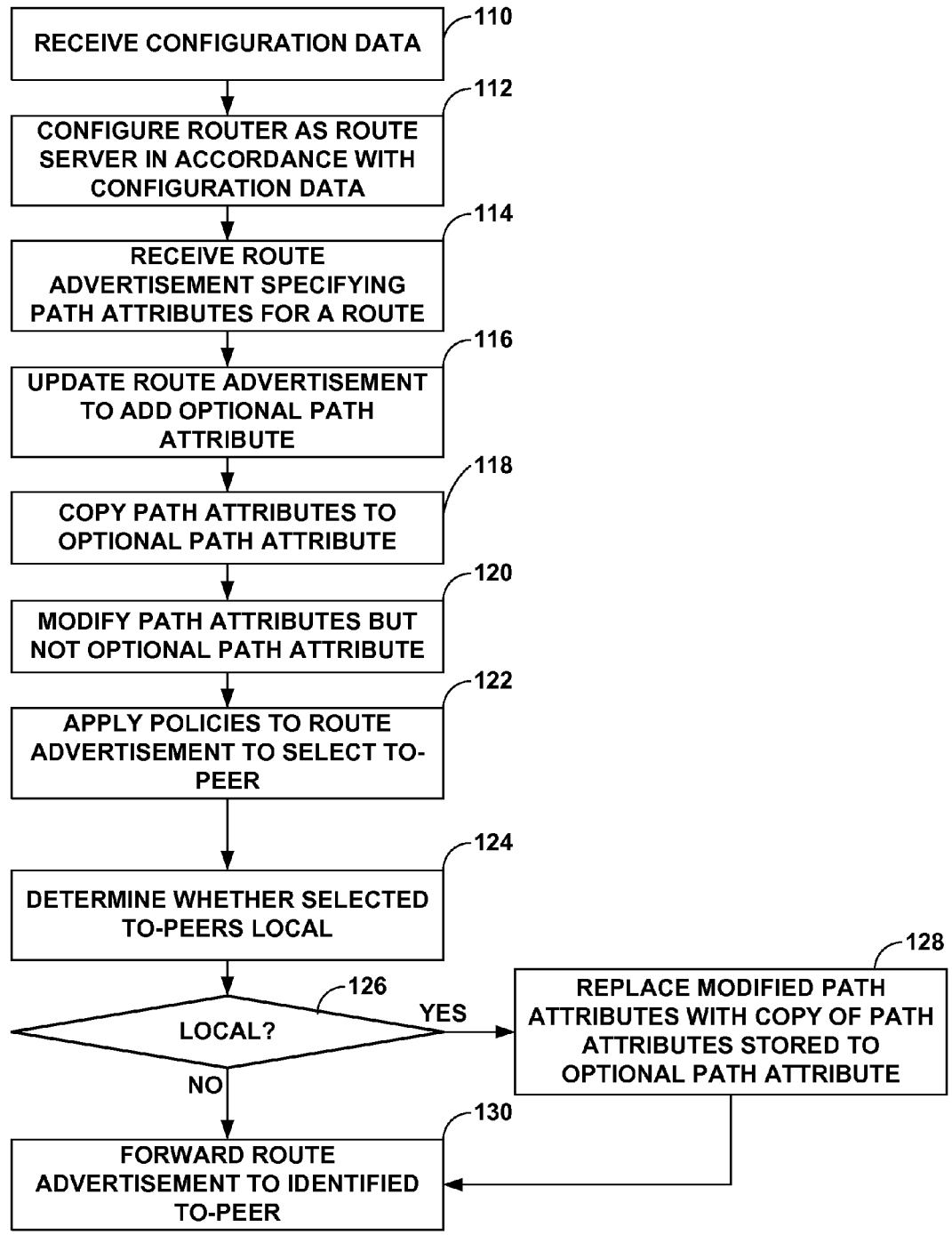
FIG. 6 is a flowchart illustrating exemplary operation of a network device in implementing additional aspects the techniques described in this disclosure.

FIG. 6 is a flowchart illustrating exemplary operation of a network device, such as route server 98A shown in the example of FIG. 5, in implementing various aspects the techniques described in this disclosure. While described with respect to route server 98A, the techniques may generally be implemented by any network device capable of facilitating the exchange of routing information between two or more service provider networks.

Initially, an administrator or other network operator interfaces with a user interface presented by UI module 32 to enter configuration data that configures a router to act as a route server. In other words, a router that implements the techniques described in this disclosure may be able to act as a standard router or a route server. The administrator interfaces with the user interface presented by UI module 32 to enter configuration data that either configures this router to act as a standard router or a route server. The administrator, in this example, inputs configuration data that configures the router to acts as a route server. UI module 32, therefore, receives this configuration data and configures the router as route server 18 in accordance with the configuration data (110, 112).

Once configured, one of interfaces 24, i.e., interface 24A in this example, receives a route advertisement 100, as described above (114). Interface 24A forwards this route advertisement 100 to forwarding component 27, which in turn forwards route advertisement 20 to inbound processing module 36 of BGP module 34. As described above, inbound processing module 36 updates route advertisement 100 to add an optional path attribute referred to in this disclosure as RS-ATTR (116). Inbound processing module 36 then copies the original path attributes specified by route advertisement 100 to define one or more routes through SP network 14A to the optional path attribute (118). Inbound processing module 36 outputs this updated route advertisement 46 to route processing module 38, which proceeds to process updated route advertisement 46. In processing updated route advertisement 46, route processing module 46, which has not been modified to act appropriately within the context of an Internet Exchange, modifies one or more of the path attributes, but not the optional path attributes for reasons disclosed above (120). Route processing module 38 then outputs processed route advertisement 102 to outbound processing module 40.

IX route processing module 42 of outbound processing module 40 receives processed route advertisement 102 and applies policies 44 to processed route advertisement 100 to identify those of route servers 98A's peers to which to forward route advertisement 20 (122). That is, IX route processing module 42 applies policies 44 to processed route advertisement 100 to determine whether this route advertisement should be advertised to the specified "to-peer." IX route processing module 42 then determines whether those of the identified peers are local or remote to route server 98A in the manner described above (124). If local ("YES" 126), IX route processing module replaces the modified path attributes in processed route advertisement 102 with the copy of the path attributes stored to the optional path attribute and forwards route advertisement 100 to the identified local peers, i.e., PE routers 96A, 96B of SP networks 94A, 94B respectively in this example (128). If one or more of the identified to-peers are determined not to be local, IX route processing module 42 forwards processed route advertisement 102 to the identified remote peers, i.e., route server 98B in this example, again in the manner described above (128).

In this manner, the techniques described in this disclosure may be extended to route server clusters that provide more than one route server in order to provide an Internet Exchange. The techniques therefore may be extensible to any number of route servers in a cluster. Commonly, these route server clusters are implemented as a multi-chassis route-server, where a backbone chassis provides interconnectivity between a number of routers that are configured to couple to the chassis and through the chassis to one another. The techniques may therefore facilitate the development of route server clusters in that only one code base for routers may need to be maintained that provides for both standard routing functionality and the special purpose route server functionality.

Various embodiments of the techniques have been described. These and other embodiments are within the scope of the following claims.

The invention claimed is:

1. A method of exchanging routes between a plurality of service provider networks with a route server of an Internet Exchange, the method comprising:
    receiving a route advertisement that conforms to a border gateway protocol (BGP) and that advertises a route from one of the plurality of service provider networks with an inbound processing module of the route server, wherein the route advertisement identifies a destination reachable by the route and defines one or more attributes providing topology information associated with the route;
    updating, with the inbound processing module of the route server, the route advertisement to add an optional field that stores a copy of the one or more attributes for the advertised route as original path attributes, wherein the optional field comprises an optional, transitive BGP path attribute that is designated as storing opaque values that are to be left unmodified by to a route processing module of the route server;
    processing the updated route advertisement with the route processing module of the route server to update routing information of the route server and produce an outbound route advertisement to advertise the route to one or more of the service provider networks, wherein the outbound route advertisement includes one or more attributes for the Internet Exchange and further includes within the optional field the original attributes without modification;
    processing the outbound route advertisement with an output processing module of the route server to replace the attributes of the Internet Exchange with the original attributes stored within the optional field; and
    outputting the outbound route advertisement from the route server to advertise the route to one or more of the service provider networks,
    wherein the inbound processing module, route processing module and the outbound processing module implement different aspects of the border gateway protocol (BGP).

2. The method of claim 1,
wherein the route processing module is configured to leave intact optional fields designated as storing opaque values.

3. The method of claim 1, further comprising:
storing, with the outbound processing module, a policy that define at least one to-peer rule for processing route advertisements based on which of the plurality of network service providers are to receive the route advertisements and at least one from-peer rule for processing route advertisements based on which of the plurality of network service providers sent the route advertisements;
performing route processing with the outbound processing module of the route server to process the previously processed route advertisement in accordance with the policy so as to identify to which of the plurality of network service providers to which the route advertisement are to be forwarded.

4. The method of claim 1,
wherein the route server comprises a distributed route server comprising a plurality of network devices positioned at different network locations within the Internet Exchange,
wherein a first one of the plurality of network devices includes the outbound processing module,
wherein the method further comprises sending, with the outbound processing module of the first one of the plurality of network devices, the processed route advertisement that includes the modified one or more attributes and the optional field that stores the unmodified copy of the one or more attributes to a second one of the plurality of network devices.

5. The method of claim 4, further comprising:
storing, with the outbound processing module of the second one of the plurality of network devices, a policy that define at least one to-peer rule for processing route advertisements based on which of the plurality of network service providers are to receive the route advertisements and at least one from-peer rule for processing route advertisements based on which of the plurality of network service providers sent the route advertisements;
performing route processing with the outbound processing module of a second one of the plurality of network devices to process the previously processed route advertisement in accordance with the policy so as to identify to which of the plurality of network service providers to which the route advertisement are to be forwarded.

6. The method of claim 1, further comprising receiving configuration data that specifies whether or not the route server is to act as a route server peer or an Internet peer with respect to one or more interfaces,
    wherein updating the route advertisement to add the optional field comprises updating, with the inbound processing module of the route server, the route advertisement to add the optional field that stores a copy of the one or more attributes for the advertised route as original attributes based on the configuration data, and
    wherein processing the outbound route advertisement comprises processing the outbound route advertisement with an output processing module of the route server to replace the attributes of the Internet Exchange with the original attributes stored within the optional field based on the configuration data.

7. A route server of an Internet Exchange that exchanges routes between a plurality of service provider networks, the route server comprising:
- at least one interface that receives a route advertisement conforming to a border gateway protocol (BGP) and advertising a route from one of the plurality of service provider networks, identifying a destination reachable by the route and defining one or more attributes providing topology information associated with the route;
- a control unit that processes the route advertisement, wherein the control unit includes:
- an inbound processing module that updates the route advertisement to add an optional field that stores a copy of the one or more attributes for the advertised routes as original attributes, wherein the optional field comprises an optional, transitive BGP path attribute that is designated as storing opaque values that are to be left unmodified by to a route processing module of the route server;
- the route processing module of the route server that updates routing information of the route server and produces an outbound route advertisement to advertise the route to one or more of the service provider networks, wherein the outbound route advertisement includes one or more attributes for the Internet Exchange and further includes within the optional field the original attributes without modification; and
- an outbound processing module that processes the outbound route advertisement to replace the attributes of the Internet Exchange with the original attributes stored within the optional field and outputs the outbound route advertisement to advertise the route to one or more of the service provider networks, wherein the inbound processing module, route processing module and the outbound processing module implement different aspects of the border gateway protocol (BGP).

8. The route server of claim 7,
- wherein the route processing module is configured to leave intact optional fields designated as storing opaque values.

9. The route server of claim 7, wherein the outbound processing module stores a policy that define at least one to-peer rule for processing route advertisements based on which of the plurality of network service providers are to receive the route advertisements and at least one from-peer rule for processing route advertisements based on which of the plurality of network service providers sent the route advertisements and performs route processing to process the previously processed route advertisement in accordance with the policy so as to identify to which of the plurality of network service providers to which the route advertisement are to be forwarded.

10. The route server of claim 7,
- wherein the route server comprises a distributed route server comprising a plurality of network devices positioned at different network locations within the Internet Exchange,
- wherein a first one of the plurality of network devices includes the outbound processing module,
- wherein the outbound processing module of the first one of the plurality of network devices sends the processed route advertisement that includes the modified one or more attributes and the optional field that stores the unmodified copy of the one or more attributes to a second one of the plurality of network devices.

11. The route server of claim 10, wherein the second one of the plurality of network devices includes an outbound processing module that stores a policy defining at least one to-peer rule for processing route advertisements based on which of the plurality of network service providers are to receive the route advertisements and at least one from-peer rule for processing route advertisements based on which of the plurality of network service providers sent the route advertisements and performs route processing to process the previously processed route advertisement in accordance with the policy so as to identify to which of the plurality of network service providers to which the route advertisement are to be forwarded.

12. The route server of claim 7, further comprising a user interface module that receives configuration data specifying whether or not the route server is to act as a route server peer or an Internet peer with respect to the at least one interface,
- wherein the inbound processing module updates the route advertisement to add the optional field that stores the copy of the one or more attributes for the advertised route as original attributes based on the configuration data, and
- wherein the outbound processing module processes the outbound route advertisement to replace the attributes of the Internet Exchange with the original attributes stored within the optional field based on the configuration data.

13. A network system comprising:
- a plurality of network service providers that each include a provider edge router; and
- an Internet Exchange that supports advertisement of routes between the plurality of service provider networks, wherein the Internet Exchange includes a route server,
- wherein the route server couples to at least one of the provider edge routers of the plurality of service provider networks, and
- wherein the route server includes:
- at least one interface that receives a route advertisement conforming to a border gateway protocol (BGP) and advertising a route from one of the plurality of service provider networks, identifying a destination reachable by the route and defining one or more attributes providing topology information associated with the route;
- a control unit that processes the route advertisement, wherein the control unit includes:
- an inbound processing module that updates the route advertisement to add an optional field that stores a copy of the one or more attributes for the advertised routes as original attributes, wherein the optional field comprises an optional, transitive BGP path attribute that is designated as storing opaque values that are to be left unmodified by to a route processing module of the route server;
- the route processing module of the route server that updates routing information of the route server and produces an outbound route advertisement to advertise the route to one or more of the service provider networks, wherein the outbound route advertisement includes one or more attributes for the Internet Exchange and further includes within the optional field the original attributes without modification; and
- an outbound processing module that processes the outbound route advertisement to replace the attributes of the Internet Exchange with the original attributes stored within the optional field and outputs the outbound route advertisement to advertise the route to one or more of the service provider networks, wherein the inbound processing module, route processing module and the outbound processing module implement different aspects of the border gateway protocol (BGP).

14. The network system of claim 13,
wherein the route processing module is configured to leave intact optional fields designated as storing opaque values.

15. The network system of claim 13, wherein the outbound processing module stores a policy that define at least one to-peer rule for processing route advertisements based on which of the plurality of network service providers are to receive the route advertisements and at least one from-peer rule for processing route advertisements based on which of the plurality of network service providers sent the route advertisements and performs route processing to process the previously processed route advertisement in accordance with the policy so as to identify to which of the plurality of network service providers to which the route advertisement are to be forwarded.

16. The network system of claim 13,
wherein the route server comprises a distributed route server comprising a plurality of network devices positioned at different network locations within the Internet Exchange,
wherein a first one of the plurality of network devices includes the outbound processing module,
wherein the outbound processing module of the first one of the plurality of network devices sends the processed route advertisement that includes the modified one or more attributes and the optional field that stores the unmodified copy of the one or more attributes to a second one of the plurality of network devices.

17. The network system of claim 16, wherein the second one of the plurality of network devices includes an outbound processing module that stores a policy defining at least one to-peer rule for processing route advertisements based on which of the plurality of network service providers are to receive the route advertisements and at least one from-peer rule for processing route advertisements based on which of the plurality of network service providers sent the route advertisements and performs route processing to process the previously processed route advertisement in accordance with the policy so as to identify to which of the plurality of network service providers to which the route advertisement are to be forwarded.

18. The network system of claim 13, further comprising a user interface module that receives configuration data specifying whether or not the route server is to act as a route server peer or an Internet peer with respect to the at least one interface,
wherein the inbound processing module updates the route advertisement to add the optional field that stores the copy of the one or more attributes for the advertised route as original attributes based on the configuration data, and
wherein the outbound processing module processes the outbound route advertisement to replace the attributes of the Internet Exchange with the original attributes stored within the optional field based on the configuration data.

19. A non-transitory computer-readable medium comprising instructions that cause one or more processors of a network device to:
receiving a route advertisement that conforms to a border gateway protocol (BGP) and that advertises a route from one of a plurality of service provider networks with an inbound processing module of a route server of an Internet Exchange that exchanges routes between the plurality of service provider networks, wherein the route advertisement identifies a destination reachable by the route and defines one or more attributes providing topology information associated with the route;
update, with the inbound processing module of the route server, the route advertisement to add an optional field that stores a copy of the one or more attributes for the advertised route as original attributes, wherein the optional field comprises an optional, transitive BGP path attribute that is designated as storing opaque values that are to be left unmodified by to a route processing module of the route server;
process the updated route advertisement with the route processing module of the route server to update routing information of the route server and produce an outbound route advertisement to advertise the route to one or more of the service provider networks, wherein the outbound route advertisement includes one or more attributes for the Internet Exchange and further includes within the optional field the original attributes without modification;
process the outbound route advertisement with an outbound processing module of the route server to replace the attributes of the Internet Exchange with the original attributes stored within the optional field; and
output the outbound route advertisement from the route server to advertise the route to one or more of the service provider networks, wherein the inbound processing module, route processing module and the outbound processing module implement different aspects of the border gateway protocol (BGP).

20. The method of claim 1, wherein the Internet exchange enables the plurality of service provider networks to, from the perspective of the plurality of service providers, exchange the routing information as if the plurality of service providers were directly connected.

* * * * *